Patented Jan. 18, 1938

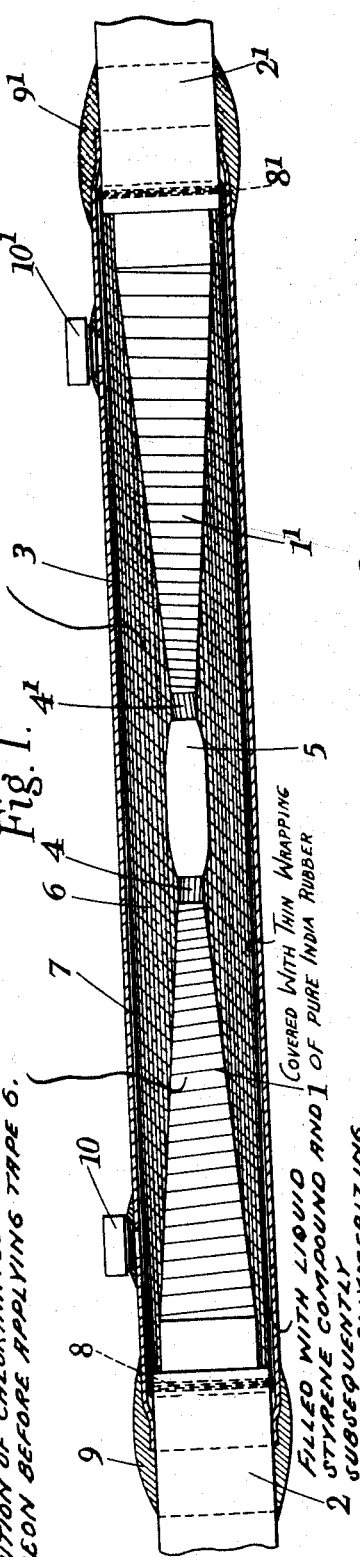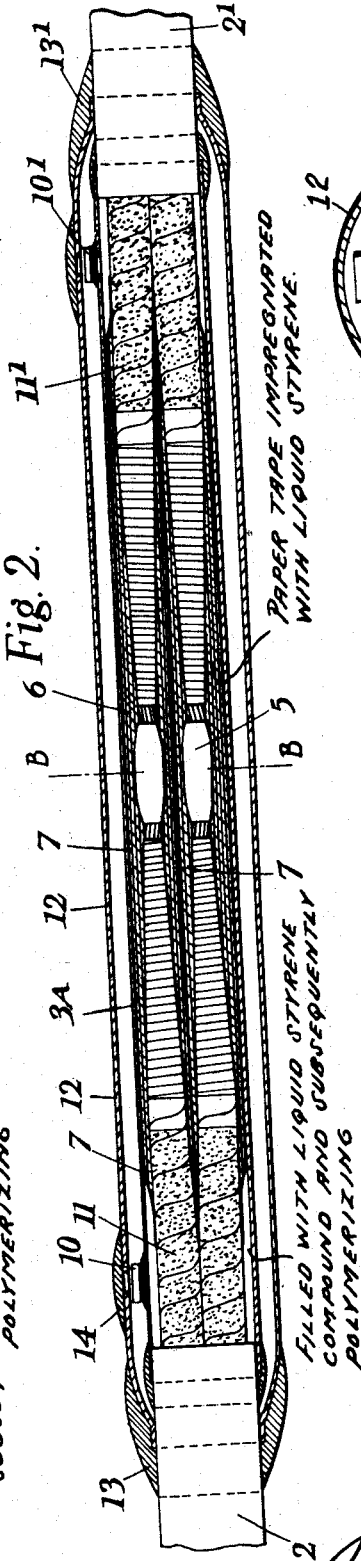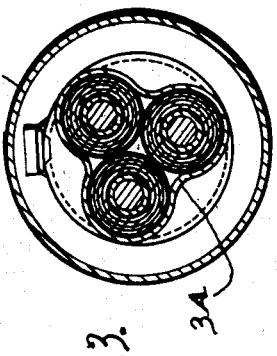

2,105,567

UNITED STATES PATENT OFFICE 2,105,567

JOINT FOR HIGH TENSION ELECTRIC CABLES

John Krauss Webb, Aldwych, London, England, assignor to International Standard Electric Corporation, New York, N. Y.

Application September 28, 1934, Serial No. 745,931
In Great Britain December 4, 1933

7 Claims. (Cl. 173—268)

This invention is for improvements in or relating to joints for high tension electric cables.

The invention provides a method of jointing high tension cables which comprises insulating the joint with a liquid polymerizable material free from volatile solvents, for example an aromatic mono-olefine such as styrene, and thereafter polymerizing the material to form a solid insulation at the joint.

The invention also provides a method of jointing oil impregnated paper insulated high tension cables which comprises insulating the joint with a liquid polymerizable material for example a mixture of styrene and chlorinated aromatic hydrocarbon and thereafter polymerizing the mixture on the joint to form a continuous welded connection with the impregnated paper insulation of the cable.

Preferably paper or like tape impregnated with the said styrene or styrene mixture is first applied to the joint.

The invention further provides a process of jointing high tension cables wherein after the conductor has been joined and a lead or like sleeve has been fitted over the joint, styrene or a mixture of styrene and chlorinated aromatic hydrocarbon is filled into the sleeve preferably under pressure, and heat is applied to polymerize the styrene in the sleeve to form a solid mass of insulating material therein.

The invention also provides an improved method of constructing barrier joints in oil impregnated cables by blocking the channels which may exist between the joint sleeve and the styrene insulation and in the copper strand as will be hereinafter described.

The above and other features of the invention will be described with reference to the accompanying drawings, in which Fig. 1 is a longitudinal section of a single core cable joint constructed in accordance with this invention;

Fig. 2 is a longitudinal section of a three-core cable joint according to the invention;

Fig. 3 is a cross-section on the line B—B of Fig. 2;

Fig. 4 is a diagram showing the method of filling the joint, and

Fig. 5 is a diagram showing one arrangement for heating the joint.

In making a single core joint according to the invention as shown in Fig. 1, the cable ends are prepared for jointing in the usual manner, the paper insulation being removed to form a taper at the respective cable ends as shown at 1, 1', and the outer metallized paper being removed up to the lead sheaths 2, 2'. The lead sleeve 3 is slipped over one cable end and the two cable cores 4, 4' are joined by means of the ferrule 5 in the usual manner. This ferrule may be of the hollow or solid type according to whether a straight through or barrier type of joint is to be provided.

The tapered insulation is preferably wiped down with a solution of chlorinated diphenyl which assists the actual impregnating of the papers by the styrene at the subsequent filling stage, as it removes the oily barrier which otherwise might prove to be impenetrable by the filling medium. Paper tapes impregnated with styrene are wound around the joint in successive layers as indicated at 6, until the diameter of the insulation for the full length of the joint reaches that of the external diameter of the lead sheath. The applied insulation is secured at each end by cotton string impregnated with styrene and an over-all binding of metallized paper 7 is wound over the insulation of the joint, care being taken to ensure that good contact is made between the lead sheaths and the metallized paper, for example, by the binding indicated at 8, 8'.

The lead sleeve 3 is then slipped into position over the joint and plumbed to the cables sheaths 2, 2' as indicated at 9, 9'. This sleeve is provided with filling plugs 10, 10' through which the evacuation and impregnation with styrene are effected as will be hereinafter described.

In making a three core cable joint as shown in Figs. 2 and 3, the procedure for each individual core is similar to that already described with reference characters to Fig. 1, and the same references herein refer to similar parts. In this case, however, the outer binding of metallized paper 7 on each of the cores makes electrical connection with the outer metallized paper layers of the cores indicated at 11, 11', so that the diameter of the completed joint is substantially the same as that of the external diameter of the lead sheath 2, 2'.

As will be seen, this joint is provided with two lead sleeves, the inner one 3A being provided with filling plugs 10, 10', as described with reference to the construction in Fig. 1, but in this case the sleeve is constructed of thinner metal and it is collapsed around the insulated cable cores as shown in cross-section in Fig. 3. This can be conveniently effected by applying vacuum to one of the filling plugs whilst the other remains closed, whereby the sleeve collapses inwards to conform to the core section. If necessary, the sleeve may be further dressed down by hand so that as much space as possible between the cores inside the sleeve is eliminated. After the filling and polymerizing process has been applied to the joint as will be hereinafter described, the outer sleeve 12 is placed in position and plumbed to the cable sheaths as indicated at 13, 13'. If desired two copper tube nipples may be soldered into the outer sleeve and an air pressure applied in order to test the soundness of the wiped joints. After this test, the copper tubes may be connected respectively to a reservoir containing suitable filling oil and a vacuum pump whereby the sleeve may be completely filled with insulating oil after which the nipples are removed and the holes in the sleeves wiped over as indicated at 14, 14'. The joint is now completed except for the fixing of the outer protection cover and necessary armour fixing or bonding requirements.

Figures 4, 5:
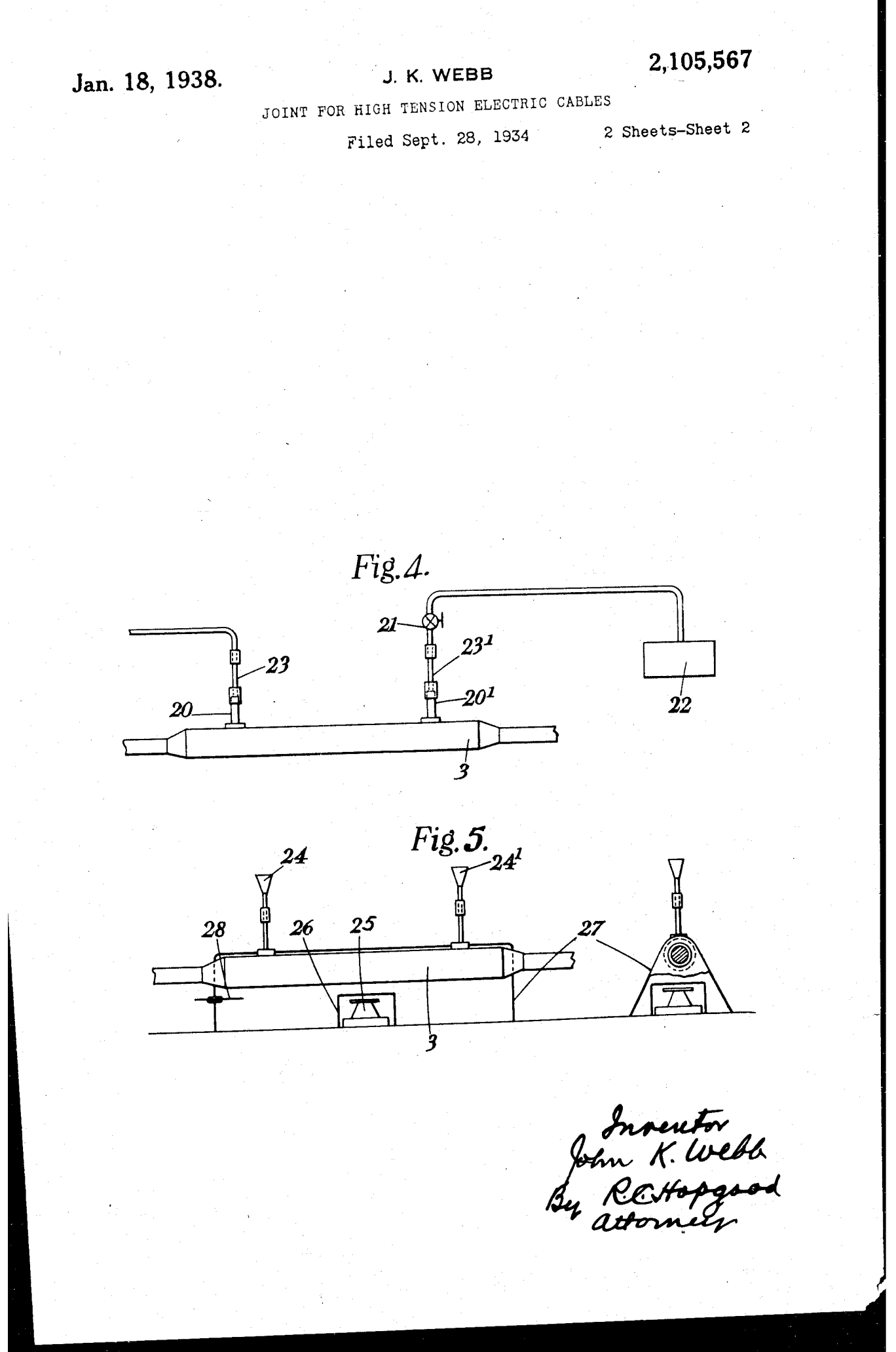

Referring now to the actual method of filling and polymerizing joints according to this invention, reference will be made to Figs. 4 and 5, the method of filling being substantially the same as that commonly employed for filling oil impregnated joints, with the exception that styrene compound is used instead of oil. As will be seen from Fig. 4, filling pipes 20, 20' are screwed into the filling plugs provided on the sleeve of the joint. Pipe 20 is connected to a vacuum pump whereas pipe 20' is connected through a feed control tap 21 to the compound reservoir 22. Suitable glass sight tubes 23, 23' are included in the pipe connections by means of rubber connecting sleeves as shown. Pumping proceeds for a short time after which the tap 21 is opened and the compound will fill the sleeve and overflow up into the pipe connected to the pump. When the compound appears at the sight glass, pumping should cease and the filling pipes may be disconnected from the pump and the compound supply respectively. Glass funnels as indicated at 24, 24' in Fig. 5 are then fixed to the pipes and these in turn are filled up with styrene compound.

After completion of the filling, the heating apparatus which may be of any suitable type is applied to the joint. As shown in Fig. 5, the heating unit 25 which may be enclosed in a baffle 26, is arranged within an asbestos or like enclosure 27 which houses the complete joint. The temperature should be maintained at between 120° C. and 130° C. for a sufficient period for the styrene to acquire a definitely resinous consistency. This indicates that the degree of polymerization is adequate. A thermometer as indicated at 28 may be provided to keep a check on the temperature. During the heating period, the two funnels 24, 24' should be topped up as required in order to maintain the styrene filling in the joint. The joint is finally allowed to cool slowly after which the filling tubes are removed and the filling plugs are inserted. The joint is now completed except for the fixing of an outer protection cover or armour as may be required.

During the heating process the styrene is polymerized to polystyrene with the result that at the conclusion of the heat treatment the applied tapes are welded into a solid mass of insulating material of very high dielectric properties. The mass is also, owing to the action of the chlorinated aromatic hydrocarbon, welded into the tapered cable insulation so that the tapered surface no longer exists and the path of low resistance to electrical flashover or breakdown is eliminated.

A joint so constructed will constitute a barrier joint if precautions are taken to block the channels which may exist in the copper strand and which may exist between the outside circumference of the joint insulation and the interior circumference of the joint sleeve. The former channel can be blocked by well-known methods e. g. the use of a "solid" ferrule. The latter channel can be blocked in any suitable manner but the following methods appear to be preferable:—

(a) During the evacuation prior to filling the sleeve which may be of thin lead may be compressed onto the insulation of the joint and thereafter held compressed in position by an outer sleeve or armouring protection applied under compressive forces.

(b) Over the joint insulation proper and over any electrostatic screen such as metallized paper applied as an overall finish to the insulation a lapping of thin pure india rubber may be applied. Oil in attempting to leak through this lapping will transform the rubber into a plastic mass which resists further leakage. This method may be used in conjunction with (a).

(c) It has been discovered that under certain conditions the styrene during polymerization adheres tenaciously to the lead sleeve and any adjacent metal thereby eliminating the necessity for any special packing means as described above. To ensure such adherence the inner surface of the metal sleeve may be roughened or serrated.

Although it is possible according to this invention to construct the joint without building up the insulation with styrene impregnated tapes there is the objection that such procedure may involve the decentralization of the copper connection and the formation of large ionizable voids during polymerization. The procedure above described is therefore to be preferred in practice.

The addition of the chlorinated aromatic hydrocarbon, which is a solvent both for styrene and for hydrocarbon oil, has many beneficial effects. It ensures the weld between original cable insulation and the new joint insulation. It also incorporates any oil which may flow into the joint during processing thereby producing a more flexible final production than the pure polystyrene. As previously described the tapered cable insulation may be painted with chlorinated aromatic hydrocarbon before applying the styrene impregnated tape insulation. Examples of chlorinated aromatic hydrocarbon are:—

(a) Chlorinated naphthalene.
(b) Chlorinated diphenyl.

Styrene is chemically known as phenylethylene or vinylbenzene. Formula $C_6H_5 \cdot CH:CH_2$. The following is one method for the preparation of styrene:—

The dehydration of beta phenyl ethyl alcohol comprises the subtraction of 1 molecule of water per molecule of alcohol.

$$\underset{\text{Beta phenyl ethyl alcohol}}{C_6H_5CH_2CH_2OH} - H_2O \rightarrow \underset{\text{Styrene}}{C_6H_5CH:CH_2}$$

With regard to heating, investigation has shown that polymerization proceeds so rapidly during the first 3 or 4 hours at 120° C. that the liquid thickens during this time to a point outside the range of viscometry, i. e. it becomes plastic. It has further been proved that despite the removal of the temperature (e. g. reduction from 120° C. to 20° C.) polymerization thereafter proceeds at a fairly rapid rate. Conductor heating due to carrying of current, and electrical stress, due to application of voltage to the cable both aid polymerization so that if cables are put into service before polymerization of the joints is complete the joint will continue to polymerize and thereby automatically be strengthened.

The saving effected in dimensions over the smallest known equivalent joints is of the following order:—Diameter—approximately ¾"–1", length—approximately 10"–14".

It will be understood that the scope of the invention is not limited to the precise details given herein. Moreover, although styrene is the only material at present known to give satisfaction it is possible that other aromatic mono-olefines may be found to be suitable. Furthermore joints made in accordance with the principles of this invention must not be confused with proposals which have been made from time to time to use materials like "Bakelite" varnish as a filling medium in cable joints, "Bakelite" varnish being a varnish which employs as a base "Bakelite", a phenol condensation product. In such cases the material is changed from the liquid to the solid state by boiling off the volatile constituents which inevitably results in the formation of blow holes; nor can a weld with the oily surface of the cable papers be effected, for which reasons these prior processes have never met with any success.

What is claimed is:—

1. A method of jointing oil impregnated paper insulated high tension cables which comprises insulating the joint with a mixture of styrene and chlorinated aromatic hydrocarbon and thereafter polymerizing the mixture on the joint to form a homogeneous solid insulation with the impregnated paper insulation of the cable.

2. The method of jointing oil impregnated paper insulated high tension cables, comprising tapering in known manner the paper insulation at the ends of the cable cores to be jointed, treating the tapered paper insulation with a solution of chlorinated aromatic hydrocarbon, applying to the jointed cores' paper tapes impregnated with styrene and extending such tapes over said tapered insulation, and subsequently applying liquid styrene to the joint and polymerizing it on the joint to form a solid insulation thereat.

3. The method of jointing multi-core high tension cables which comprises jointing and insulating the individual cores thereof and closing the jointed cores in a sleeve and uniting the sleeve in known manner with the cover of the cables being jointed, filling the sleeve with liquid styrene, collapsing the sleeve about the cores and polymerizing said liquid styrene to form a solid insulation about said jointed cores.

4. A method of jointing oil impregnated paper insulated high tension electric cables which comprises stripping the insulation from the ends of the cables to be joined, uniting the conductors to make an electrical connection, treating the exposed paper insulation at the ends of the cables with a mixture of liquid styrene and chlorinated aromatic hydrocarbon, thereafter wrapping the united exposed conductors with porous insulating material impregnated with liquid styrene, encasing the joint, evacuating and then filling said casing with liquid styrene, and applying heat to the joint to polymerize the liquid styrene and thus form a solid insulation about the joint.

5. The method of forming a barrier joint between sections of oil impregnated paper insulated high tension electric cables which includes the steps of exposing the core conductors and paper insulation, forming a solid joint between the core conductors, wrapping the jointed core conductors with paper tape, encasing the joint, filling the casing with liquid styrene about the paper wrapped joint, and thereafter polymerizing the styrene at the joint to form a solid insulation integral with the paper insulation of the cable.

6. A method of jointing oil impregnated paper insulated electric cables which includes the steps of exposing the core conductors and paper insulation of the cables, joining the core conductors, wiping the exposed paper insulation with a common solvent for oil and styrene for removing the oil from the surface thereof, some of said common solvent remaining in said insulation, covering the jointed core conductors with porous material, encasing the joint, filling the casing with liquid styrene about the porous material covered joint, and thereafter polymerizing the styrene at the joint within the casing to form a solid insulation integral with said porous material and with the paper insulation of the cable.

7. The method of forming a barrier in an oil impregnated paper insulated cable having the insulation removed from a portion thereof and a length of the conductor exposed, which comprises wrapping the exposed conductor with paper tape, encasing the wrapped conductor, filling the casing with liquid styrene about the paper wrapped conductor, and thereafter polymerizing said styrene to form a solid insulation integral with the paper insulation of the cable.

JOHN KRAUSS WEBB.